United States Patent [19]
Mehta et al.

[11] Patent Number: 5,741,563
[45] Date of Patent: Apr. 21, 1998

[54] SHRINK FILMS FROM PROPYLENE POLYMERS

[75] Inventors: Aspy Keki Mehta, Humble; Michael Chia-Chao Chen, Houston, both of Tex.

[73] Assignee: Exxon Chemical Patents Inc., Houston, Tex.

[21] Appl. No.: 688,699

[22] Filed: Jul. 30, 1996

Related U.S. Application Data

[60] Provisional application No. 60/003,861 Sep. 18, 1995.

[51] Int. Cl.$^6$ ...................................... B65B 53/00
[52] U.S. Cl. ................ 428/35.1; 428/34.9; 428/35.5; 428/35.7; 428/36.92; 428/500; 428/523; 428/910; 526/348.1; 526/348.5; 526/348.6; 526/351
[58] Field of Search ................ 526/348.1, 348.5, 526/348.6, 351; 428/523, 910, 34.9, 35.1, 35.5, 35.7, 36.92, 500

[56] References Cited

U.S. PATENT DOCUMENTS

| | | |
|---|---|---|
| 5,234,733 | 8/1993 | Schloegl et al. . |
| 5,292,561 | 3/1994 | Peiffer et al. . |
| 5,298,302 | 3/1994 | Boice et al. . |
| 5,372,882 | 12/1994 | Peiffer et al. . |
| 5,420,220 | 5/1995 | Cheruvu et al. .................... 526/160 X |
| 5,443,765 | 8/1995 | Yoshimura et al. . |

FOREIGN PATENT DOCUMENTS

| | | |
|---|---|---|
| 0628593 | 12/1993 | European Pat. Off. . |
| 0597502 | 5/1994 | European Pat. Off. . |
| 95 00333 | 1/1995 | WIPO . |
| 95 32242 | 11/1995 | WIPO . |
| 96 07699 | 3/1996 | WIPO . |

*Primary Examiner*—Fred M. Teskin
*Attorney, Agent, or Firm*—C. Paige Schmidt

[57] ABSTRACT

Shrink films prepared from metallocene catalyzed propylene homopolymers and copolymers are provided. The films exhibit a unique balance of properties as compared to known shrink films including higher stiffness, tensile strength and moisture barrier, lower extractables, improved shrinkage and increased shrink tension. In addition, the shrink behavior of the film can be substantially tailored by modifying the amount of comonomer present in the propylene polymer.

15 Claims, No Drawings

SHRINK FILMS FROM PROPYLENE POLYMERS

This application is based on Provisional Application Ser. No. 60/003,861, filed Sep. 18, 1995.

FIELD

Shrink films prepared from metallocene catalyzed propylene homopolymers and copolymers are provided. The films exhibit a unique balance of properties as compared to known shrink films including higher stiffness, tensile strength and moisture barrier, lower extractables, improved shrinkage and increased shrink tension. In addition, the shrink behavior of the film can be tailored by modifying the amount of comonomer present in the propylene polymer.

BACKGROUND

Shrink packaging films and their production are well known in the art. They are used to package a wide variety of products including many types of foods and consumer articles. Many different types of polymers are used to make shrink films but they are generally ethylene-based or propylene-based. Prior art propylene based shrink film constructions are made of conventional Ziegler-Natta catalyzed propylene polymers, which are usually random copolymers rather than homopolymers. The higher melting, higher crystallinity homopolymers cause lower levels of shrinkage which is undesirable.

SUMMARY

This invention relates to propylene films, particularly films comprising one or more layers of shrink film prepared from metallocene catalyzed, substantially isotactic polypropylene polymer having hexane extractables of less than about 3 weight percent as determined by 21 CFR 177.1520 (d)(3)(i) and (ii). In another embodiment this invention relates to films comprising one or more layers of shrink film prepared from metallocene catalyzed, substantially isotactic propylene polymer having hexane extractables of less than about 3 weight percent as determined by 21 CFK 177.1520 (d)(3)(i) and (ii) wherein the polymer comprises from about 0.1 to about 20 weight percent comonomer.

DETAILED DESCRIPTION

This invention relates to shrink films comprising propylene polymers produced by metallocene catalyst systems. We have found that shrink films prepared from such polymers have a unique balance of properties including outstanding stiffness and moisture barrier, high tensile strength, good clarity/gloss and exceptional shrinkage. Shrinkage levels can be controlled by modifying the amount of comonomer in the polymer. In addition, high shrink tension forces are obtained with these films and this property can be controlled by modifying the amount of comonomer in the polymer.

We have found both propylene homopolymers and copolymers to be useful for making the shrink films of the invention. Both are metallocene catalyzed and are substantially isotactic. "Substantially isotactic" is defined herein to mean that the percentage of isotactic pentads (mmmm) in homopolypropylene (made using the same catalyst system and under the same conditions as the polymer in question taking into account those differences required for homopolymerization as compared to copolymerization) is greater than about 70%. Preferably the percentage of isotactic pentads (mmmm) in homopolypropylene (made using the same catalyst system and under the same conditions as the polymer in question taking into account those differences required for homopolymerization as compared to copolymerization) is greater than about 80%. "Isotactic" is defined herein to mean that the percentage of isotactic pentads (mmmm) in homopolypropylene (made using the same catalyst system and under the same conditions as the polymer in question taking into account those differences required for homopolymerization as compared to copolymerization) is greater than about 90%. As used herein, "copolymer" includes polymers comprising 2 or more monomers. The percentage of isotactic pentads is measured using $^{13}$CNMR.

The propylene homopolymer useful for making the films of this invention preferably has a molecular weight distribution ($M_w/M_n$ - as determined by gel permeation chromatography) that is less than about 7.0, more preferably less than about 6.0, even more preferably from about 5.0 to about 1.0, and most preferably from about 4.0 to about 1.5.

The propylene homopolymer is preferably isotactic and preferably has a weight average molecular weight that is greater than about 140,000, preferably in the range of from about 140,000 to about 450,000, more preferably in the range of from about 190,000 to about 400,000. The melt flow rate of the homopolymer is preferably in the range of from about 0.5 dg/min. to about 30 dg/min., more preferably in the range of from about 1 dg/min. to about 10 dg/min. as measured by ASTM-D1238, condition L. The weight percent of n-hexane extractables is preferably less than about 3, more preferably, less than about 2, even more preferably less than about 1 (as determined by the procedure of 21 CFR 177.1520 (d) (3) (i)).

The propylene homopolymer preferably has a DSC peak melting temperature below about 155° C., preferably below about 150° C., more preferably below about 147° C. The unique ability of metallocene catalyst systems to produce substantially isotactic homopolypropylenes having low melting temperatures is advantageous for shrink films, offering the capability to attain higher levels of shrinkage. Conventional homopolypropylenes from Zeigler-Natta catalysts have melt temperatures greater than about 160° C. and provide low, undesirable levels of shrinkage.

Metallocene catalyzed propylene copolymers are also useful for making the films of the present invention. Preferably these copolymers comprise at least about 0.1 weight percent comonomer, more preferably from about 0.1 to about 20 weight percent comonomer, even more preferably from about 0.5 to about 15 weight percent comonomer, and most preferably from about 0.5 to about 6 weight percent comonomer based on the total weight of the copolymer The propylene copolymers are at least substantially isotactic and preferably isotactic in nature.

The comonomer preferably comprises one or more olefin(s) which have 2 or more carbon atoms but excluding 3 carbon atoms, more preferably the comonomer has 2, 4, 5, 6 or 8 carbon atoms, even more preferably the comonomer has 2, 6, or 8 carbon atoms, and most preferably the comonomer is ethylene and or hexene-1. While alpha-olefins are the preferred comonomer type, diolefins, cyclic olefins and other unsaturated monomers can also be employed to make the polymers of the present invention.

The propylene copolymers useful for making the films of this invention preferably have a molecular weight distribution ($M_w/M_n$ - as determined by gel permeation chromatography) that is less than about 7.0 more preferably less than about 6.0, even more preferably from about 5.0 to about 1.0, and most preferably from about 4.0 to about 1.5.

The propylene copolymers preferably have a weight average molecular weight that is greater than about 140,000, preferably in the range of from about 140,000 to about 450,000 more preferably in the range of from about 190,000 to about 400,000. The melt flow rate of the copolymer is preferably from about 0.5 dg/min. to about 30 dg/min., more preferably in the range of from about 1 dg/min. to about 10 dg/min. as measured by ASTM D-1238 condition L. The weight percent of n-hexane extractables is preferably less than about 3, more preferably, less than about 2, even more preferably less than about 1 (as determined per the procedure of 21 CFR 177.1520 (d) (3) (ii)). The copolymers and homopolymers described above may be blended with one or more other polymers either in the reactor or after polymerization using known blending techniques.

Additives such as antioxidant, chlorine-capturing agent, heat stabilizer, anti-static agent, anti-fogging agent, anti-blocking agent, ultraviolet absorber, lubricant, pigment, resin, talc, nucleating agent, etc. may also be included in the overall polymer composition prior to film formation. The propylene polymers useful for making the films of this invention are prepared using one or more metallocene catalyst systems. Any metallocene or combination thereof may be used. Metallocenes are generally represented by the formula $$CP_mMR_nX_q$$

wherein Cp is a cyclopentadienyl ring or derivative thereof, M is a Group 4, 5, or 6 transition metal, R is a hydrocarbyl group or hydrocarboxy group having from 1 to 20 carbon atoms, X is a halogen, and m=1–3, n=0–3, q=0–3, and the sum of m+n+q is equal to the oxidation state of the transition metal. The metallocene may be bridged or unbridged, and include heteroatoms in the structure. Examples of metallocenes are discussed in for example, U.S. Pat. Nos. 4,530,914; 4,871,705; 4,937,299; 5,124,418; 5,017,714; 5,120,867; 5,278,119; 5,304,614; 5,324,800; 5,347,025; 5,350,723; 5,391,790; and 5,391,789; EP-A- 0 591 756; EP-A-0 520 732; EP-A-0 420 436; WO 91/04257; WO 93/08221; WO 93/08199; and WO 94/01471 each incorporated fully herein by reference.

Metallocenes are well known in the art and are defined herein to mean a transition metal compound containing at least one cyclopentadienyl or cyclopentadienyl derived compound wherein the cyclopentadienyl group may be substituted at one or more positions including hydrocarbon ring systems and assemblies which may also be substituted at any position.

Particularly preferred metallocene components comprise a Group 4, 5, or 6 transition metal, biscyclopentadienyl derivative, preferably bis-indenyl metallocene components having the following general structure:

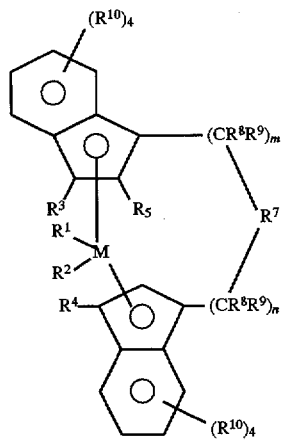

wherein M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium;

$R^1$ and $R^2$ are identical or different, are one of a hydrogen atom, a $C_1$-$C_{10}$ alkyl group, preferably a $C_1$-$C_3$ alkyl group, a $C_1$-$C_{10}$ alkoxy group, preferably a $C_1$-$C_3$ alkoxy group, a $C_6$-$C_{10}$ aryl group, preferably a $C_6$-$C_8$ aryl group, a $C_6$-$C_{10}$ aryloxy group, preferably a $C_6$-$C_8$ aryloxy group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$-$C_{10}$ alkyl group, preferably a $C_1$-$C_4$ alkyl group, which may be halogenated, a $C_6$-$C_{10}$ aryl group, which may be halogenated, preferably a $C_6$-$C_8$ aryl group, a $C_2$-$C_{10}$ alkenyl group, preferably a $C_2$-$C_4$ alkenyl group, a $C_7$-$C_{40}$ -arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$-$C_{10}$ alkyl group, preferably a $C_1$-$C_3$ alkyl group, or a $C_6$-$C_{10}$ aryl group, preferably a $C_6$-$C_9$ aryl group;

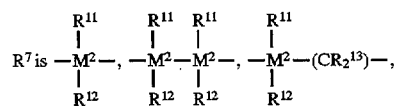

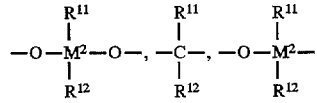

=$BR^{11}$, =$AlR^{11}$, —Ge—, —Sn—, —O—, —S—, =SO, =$SO_2$, =$NR^{11}$, =CO, $PR^{11}$, or =$P(O)R^{11}$;

wherein:

$R^{11,}$ $R^{12}$ and $R^{13}$ are identical or different and are a hydrogen atom, a halogen atom, a $C_1$-$C_{20}$ alkyl group, preferably a $C_1$-$C_{10}$ alkyl group, a $C_1$-$C_{20}$ fluoroalkyl group, preferably a $C_1$-$C_{10}$ fluoroalkyl group, a $C_6$-$C_{30}$ aryl group, preferably a $C_6$-$C_{20}$ aryl group, a $C_6$-$C_{30}$ fluoroalkyl group, preferably a $C_6$-$C_{20}$ fluoroaryl group, a $C_1$-$C_{20}$ alkoxy group, preferably a $C_1$-$C_{10}$ alkoxy group, a $C_2$-$C_{20}$ alkenyl group, preferably a $C_2$-$C_{10}$ alkenyl group, a $C_7$-$C_{40}$ arylalkyl group, preferably a $C_7$-$C_{20}$ arylalkyl group, a $C_8$-$C_{40}$ arylalkenyl group, preferably a $C_8$-$C_{22}$ arylalkenyl group, a $C_7$-$C_{40}$ alkylaryl group, preferably a $C_7$-$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

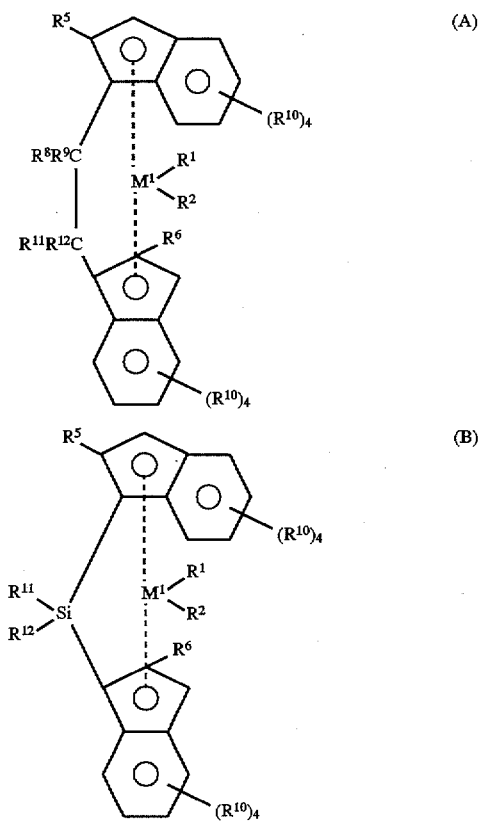

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

The chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known techniques. For special products it is also possible to use rac/meso mixtures.

Generally, these preferred metallocenes may be prepared by a multi-step process involving repeated deprotonations/metallations of the aromatic ligands and introduction of the bridge and the central atom by their halogen derivatives. The following reaction scheme illustrates this generic approach:

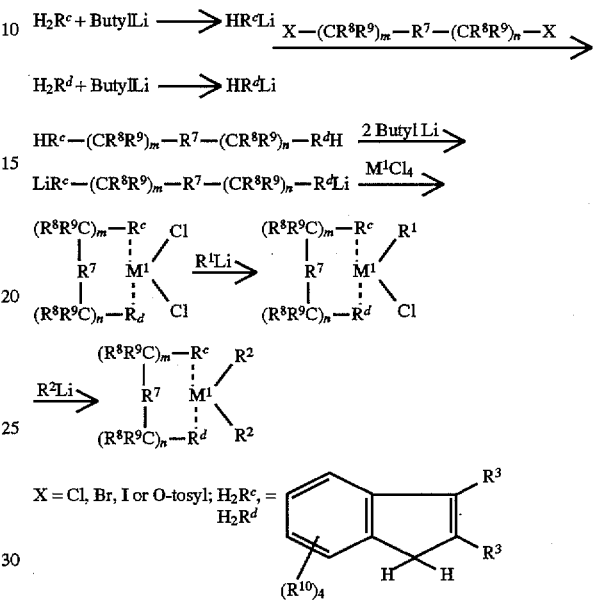

Additional methods for preparing metallocenes are fully described in the *Journal of Organometallic Chem.*, volume 288, (1985), pages 63–67, and in EP-A-320762, for preparation of the metallocenes described, both of which are herein fully incorporated by reference.

Illustrative but non-limiting examples of metallocenes include:

Dimethylsilandiylbis (2-methyl-4-phenyl-1-indenyl)$ZrCl_2$
Dimethylsilandiylbis(2-methyl-4,5-benzoindenyl)$ZrCl_2$;
Dimethylsilandiylbis(2-methyl-4,6-diisopropylindenyl) $ZrCl_2$;
Dimethylsilandiylbis(2-ethyl-4-phenyl- 1-indenyl)$ZrCl_2$;
Dimethylsilandiylbis (2-ethyl-4-naphthyl-1-indenyl)$ZrCl_2$,
Phenyl(Methyl)silandiylbis(2-methyl-4-phenyl- 1-indenyl) $ZrCl_2$,
Dimethylsilandiylbis(2-methyl-4-( 1 -naphthyl)- 1-indenyl) $ZrCl_2$,
Dimethylsilandiylbis(2-methyl-4-(2-naphthyl)- 1-indenyl) $ZrCl_2$,
Dimethylsilandiylbis(2-methyl-indenyl)$ZrCl_2$,
Dimethylsilandiylbis(2-methyl-4,5-diisopropyl-1-indenyl) $ZrCl_2$,
Dimethylsilandiylbis(2,4,6-trimethyl-1-indenyl)$ZrCl_2$,
Phenyl(Methyl)silandiylbis(2-methyl-4,6-diisopropyl-1-indenyl)$ZrCl_2$,
1,2-Ethandiylbis(2-methyl-4,6-diisopropyl-1-indenyl) $ZrCl_2$,
1,2-Butandiylbis(2-methyl-4,6-diisopropyl-1-indenyl) $ZrCl_2$,
Dimethylsilandiylbis(2-methyl-4-ethyl-1-indenyl)$ZrCl_2$,
Dimethylsilandiylbis(2-methyl-4-isopropyl-1-indenyl) $ZrCl_2$,
Dimethylsilandiylbis(2-methyl-4-t-butyl-1-indenyl)$ZrCl_2$,
Phenyl(Methyl)silandiylbis(2-methyl-4-isopropyl-1-indenyl)$ZrCl_2$, Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl)ZrCl$_2$,
Phenyl(Methyl) silandiylbis(2-methyl-4,5-benzo-1-indenyl)ZrCl$_2$,
Phenyl(Methyl)silandiylbis(2-methyl-4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Phenyl(Methyl)silandiylbis (2-methyl-a-aeenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-14ndenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(Methyl)silandiylbis(2-methyl-5-isobutyl-1-indenyl)ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

These preferred metallocene catalyst components are described in detail in U.S. Pat. Nos. 5,149,819, 5,243,001, 5,239,022, 5,296,434 and 5,276,208 and in EP 576,970 all of which are herein fully incorporated by reference.

Metallocenes are typically activated with an activator such as an ionic activator and/or an alkylalumoxane. Alkylalumoxanes may exist in the form of linear or cyclic polymers. Generally, the alkylalumoxanes preferred for use in olefin polymerization contain about 5 to 40 of the repeating units:

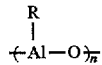

where R is a C$_1$-C$_8$ alkyl including mixed alkyls. Particularly preferred are the compounds are methylalumoxanes (where R is methyl). There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference. Alumoxanes are also commercially available.

Some methylalumoxane (MAO) solutions tend to become cloudy and gelatinous over time. It may be advantageous to clarify such solutions prior to use. A number of methods are used to create gel-free MAO solutions or to remove gels from the solutions. Gelled solutions are often simply shaken or decanted. U.S. Pat. No. 5,157,137 discloses a process for forming clear, gel-free solutions of alkylalumoxane by treating a solution of alkylalumoxane with an anhydrous salt and/or hydride of an alkali or alkaline earth metal.

The metallocene and/or activator may be supported. For purposes of this patent specification the term "carrier" and "support" are interchangeable and may be any support material, preferably a porous support material, such as for example, talc, inorganic oxides, inorganic chlorides and resinous support materials such as polyolefin or polymeric compounds or any other organic material that is porous and has an average particle size greater than 10 µm.

The preferred support materials are inorganic oxide materials, which include those from the Periodic Table of Elements of Groups 2, 3, 4, 5, 13 or 14 metal oxides, Preferably silica, alumina, silica-alumina, and mixtures thereof. Other inorganic oxides that may be used either alone or in combination with the silica, alumina or silica-alumina are magnesia, titania, zirconia, and the like.

Supported metallocene catalyst systems may be made in a variety of ways. A general support technique is described in U.S. Pat. No. 5,240,894 (fully incorporated herein by reference). This method involves contacting, in a suitable solvent or other liquid, a metallocene catalyst component as described above with alumoxane or methylalumoxane (MAO) as described above to form a reaction product in solution. The mole ratio of the aluminum of the alumoxane component to the transition metal of the metallocene component is preferably in the range of ratios between about 12:1 to about 800:1, preferably 20:1 to less than 500:1, and most preferably 50:1 to less than 400:1.

Ionizing activators, neutral or ionic, may also be used including compounds such as tri (n-butyl) ammonium tetrakis(pentaflurophenyl) boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both eationic and charge-balanced by the non-coordinating anion.

The term "noncoordinating anion" means an anion which either does not coordinate to said eation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the artion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene eation and an noncoordinating anion is also known. See, EP-A-0 426 637 and EP-A- 0 573 403 (incorporated herein by reference). An additional method of making the ionic catalyst systems uses ionizing anion precursors which are initially neutral Lewis adds but form the cation and anion upon ionizing reaction with the metallocene compounds, for example the use of tris (pentafluorophenyl) boron. See EP-A-0 520 732

(incorporated herein by reference). Ionic catalysts for addition polymerization can also be prepared by oxidation of the metal centers of transition metal compounds by anion precursors containing metallic oxidizing groups along with the artion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be convened via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Methods of supporting ionic catalysts comprising metallocene cations and noncoordinating anions are described in WO 91/09882, WO 94/03506, WO 96/04319 and in co-pending U.S. Ser. No. 08/285,380 filed Aug. 3, 1994 (incorporated herein by reference). The methods generally comprise either physical adsorption on traditional polymeric or inorganic supports that have been largely dehydrated and dehydroxylated, or using neutral artion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

Any polymerization method may be used to produce the propylene polymers useful for making the films of the invention as long as a metallocene catalyst system is used. For example, a gas, slurry or solution phase process may be used. Preferably, the polymers are prepared using a gas phase or slurry phase process, most preferably a bulk liquid propylene polymerization-process is used.

The films of this invention are shrink films including monolayer or multilayer films involving other polymer film layers, cast extruded or tubular blown extruded films, coextruded and/or laminated films. These films can be used to package an infinite variety of products, including food and non-food packaging products. Non-limiting examples are packaging for meats, pizza, produce, furniture, paper products, compact discs, records, and tapes, hardware, toiletries, medicines, toys, appliances, and office products to name a few. Packaging modes can include overwrapping, multipackaging, bundling, spray wrapping, and window packaging. Typically, propylene polymer shrink film is fabricated by initially extruding a film sheet and then orienting or stretching the film, preferably biaxially such as is performed in the production of conventional biaxially oriented propylene polymer film. The film is then heated to induce form fitting shrinkage.

The films of this invention have a number of improved properties including higher shrink tension. Preferably, the shrink tension (as measured per the description accompanying Table 3) is at least 10%, preferably at least 15%, more preferably at least 20% higher than the shrink tension of a film prepared similarly but with Ziegler-Natta produced polymer that is otherwise comparable.

Additives may be included in the film polymer compositions of this invention. Such additives and their use are generally well known in the art. These include those commonly employed with plastics such as stabilizers, neutralizers, slip agents, antiblock agents, pigments, antistatic agent, clarifiers, nucleating agents, and other additives in conventional amounts. Effective levels are known in the art and depend on the details of the base polymers, the fabrication mode and the end application. In addition, hydrogenated and/or petroleum hydrocarbon resins may be used as additives.

Examples

Shrink films consistent with this invention were prepared from four propylene copolymers and two propylene homopolymers. These were compared against shrink films prepared as in the prior art from Ziegler-Natta produced random copolymer PD 9302 E1 (Sample 1) and Ziegler-Natta produced PP 4792 (Sample 6; essentially homopolymer, 0.5 wt % ethylene comonomer). Both of the Ziegler-Natta polymer products above (Samples 1 and 6) are commercially available from Exxon Chemical Company, Houston, Tex., U.S.A. The properties of the polymers, Samples 1–8 are detailed in Table 1.

The copolymer, Sample 2, was prepared using the metallocene catalyst system rac-dimethylsilanediylbis(2-methyl-4,5-benzo-indenyl)zirconium dichloride, activated with methylalumoxane and supported on silica. This catalyst system was prepared in the following manner. A precursor solution was prepared by combining 837.4 g of 30 wt % methylalumoxane in toluene (Albemarle Corp., Baton Rouge, La.) representing 4.31 moles Al with 8.45 g of dimethylsilanediylbis(2-methyl-4,5-benzo-indenyl)zirconium dichloride (0.015 moles Zr) by stirring. Then 249 g of toluene was added and stirring was continued for 15 minutes. The precursor solution was added to 783 g of Davison MS948 silica (1.6 cc/g pore volume - available from W. R. Grace, Davison Chemical Division, Baltimore, Maryland) previously heated to 600° C. under $N_2$. The ratio of liquid volume to total silica pore volume was 0.95. The solid appeared dry and free flowing. The volatiles were removed by drying at reduced pressure (737+mm Hg vacuum) and temperatures as high as 65° C. for a total of 24.5 hours. 1056 g finely divided, free-flowing solid catalyst were obtained. Elemental analysis showed 0.13 wt % Zr and 12.14 wt % Al.

Several batches of this catalyst system were combined to yield the charge required for the polymerization run. Prior to using for polymerization, 2 wt % Kernamine AS-990 (available from Witco Corporation, Greenwich, Conn.), was added to the catalyst dry solids. The catalyst was then oil slurried (15 wt %) for ease of addition to the reactor.

The procedure for polymerizing Sample 2 was as follows. The polymerization of propylene/ethylene copolymer was conducted in a pilot scale continuous, stirred tank, bulk liquid phase polymerization process employing two reactors in series. The reactors were equipped with jackets for removing the heat of polymerization. The reactor temperature was set at 55° C. in the first reactor and 51° C. in the second reactor. Catalyst was fed at the rate of 9.2 g/hr. Triethylaluminum (TEAL) was employed as scavenger and fed at a rate of 2.25 ml/min. of a 2 wt % solution of TEAL in hexane solvent. Propylene was fed at a rate of 99.8 kg/hr. Ethylene was used as comonomer and its flow rate adjusted to provide an incorporation level of about 1.0 wt %. Residence times were 3 hours in the first reactor and 2.2 hours in the second reactor. The production rate of polymer was 13.6 kg/hr. The polymer was discharged from the reactor as a granular product having an MFR of 3.9 dg/min. and a comonomer content of 1.1 wt % ethylene.

Another copolymer, Sample 3, was prepared using the same catalyst system as was used to make Sample 2.

The procedure for polymerizing Sample 3 was as follows. The polymerization was conducted in a pilot scale loop reactor unit, employing one loop. The operation was as a liquid full reactor and triethylaluminum (TEAL) was employed as the scavenger. TEAL was employed as a 2% solution in n-heptane solvent and fed at a rate of 220 ml/hr. Propylene was fed to the reactor at a low flow rate of 42.4 kg/hr in order to maximize residence time. The reactor temperature was 55° C. The flow rate of hexene-1 comonomer was adjusted to yield an incorporation level of 1 to 1.5 wt. %. Catalyst was fed to the reactor at a rate of 10.7 g/hr. Productivity during the run was about 420 g/gcat, with a production rate of about 4.5 kg/hr. The experiment was continued until the supply of catalyst was consumed at which time the run was terminated. 82 kg of product were collected having an MFK of about 4.2 dg/min. and hexene-1 incorporation level of about 1.2 weight percent.

A homopolymer, Sample 4, was prepared using the metallocene catalyst system rac dimethylsilylbis(2-methyl-4-phenylindenyl)zirconium dichloride, activated with methylalumoxane and supported on silica. This catalyst system was prepared in the following manner.

A precursor solution was prepared by combining 343 g of 30 wt % methylalumoxane in toluene (SAS-L1 from Albemarle Corp., Baton Rouge, La.) representing 1.76 moles Al with 6.36 g of dimethylsilylbis(2-methyl-4-phenyl-indenyl) zirconium dichloride (0.01 moles Zr) by stirring. Then 367 g of toluene was added and stirring was continued for 15 minutes. The precursor solution (625.9 g) was added to 392 g of Davison MS948 silica (1.6 cc/g pore volume—available from W. R. Grace, Davison Chemical Division, Baltimore, Md.) previously heated to 600° C. under $N_2$. The ratio of liquid volume to total silica pore volume was 1.10. The solid had the consistency of damp sand and was dried at reduced pressure (483+mm Hg vacuum) and temperatures as high as 50° C. over 16 hours. 485.5 g finely divided, free-flowing solid catalyst were obtained. Elemental analysis showed 0.09 wt % Zr and 7.37 wt % Al.

Several batches of catalyst system were combined to provide the charge for the polymerization run. The catalyst system was oil slurfled (15 wt %) for ease of addition to the reactor.

The procedure for polymerizing Sample 4 was as follows. The polymerization was conducted in a pilot scale, two reactor, continuous, stirred tank, bulk liquid-phase process. The reactors were equipped with jackets for removing the heat of polymerization. The reactor temperature was set at 70° C. in the first reactor and 66° C. in the second reactor. Catalyst was fed at a rate of 6.6 g/hr. TEAL (2 wt % in hexane) was used as scavenger at a rate of 1.6 g/hr. The catalyst system prepared above was fed as a 15% slurry in mineral oil and was flushed into the reactor with propylene. Propylene monomer was fed to the first reactor at a rate of 73 Kg./hr and to the second reactor at 27 kg/hr. Reactor residence time was about 2.3 hours in the first reactor and about 1.7 hours in the second reactor. Polymer production rates were about 16 kg/hr in the first reactor and about 8 kg/hr in the second reactor. Polymer was discharged from the reactors as granular product having an MFK of 4.3 dg/min.

Another homopolymer, Sample 5, was prepared by using a catalyst system that employed a mix of two metallocenes on a silica support. The catalyst system was prepared as follows. In an inert nitrogen atmosphere, 8.0 g of rac dimethylsilanediyl-bis (2-methyl-4-phenylindenyl) zirconium dichloride was combined with 6.0 g of rac dimethylsilanediyl-bis(2-methyl-indenyl) zirconium dichloride and 780 g of 30 wt % methylalumoxane solution in toluene (Albemarle Corporation, Baton Rouge, La.). 860 g of toluene were added to dilute the solution. Separately 939 g MS948 silica (Davison Chemical Division of W. R. Grace, Baltimore, Md.) previously dehydrated to 600° C. in a stream of flowing nitrogen was charged to the catalyst preparation vessel. With the agitator on, the metallocene-alumoxane solution was added to the silica. After addition of the solution, mixing continued for one hour and then vacuum was applied to the vessel. A slight nitrogen purge was added to the bottom of the vessel to aid in removing the volatiles. At the end of the drying, 1454 g of free flowing solid were obtained. Analysis showed a loading of 8.95 wt % Al and 0.17 wt % Zr, with an Al/Zr molar ratio of 180.

Several batches of the catalyst system were combined to provide the charge for the polymerization run. The catalyst system was oil slurried (15 wt %) for ease of addition to the reactor.

The procedure for polymerizing Sample 5 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 13.5 g/hr. Triethylaluminum (TEAL) was employed as scavenger and fed at a rate of 2 ml/min of a 2 wt % solution of TEAL in hexane solvent. Propylene was fed at a rate of 65.8 kg/hr to the first reactor and 27.2 kg/hr to the second reactor. Hydrogen was added for molecular weight control, at 600 mppm in the first reactor and 900 mppm in the second reactor. Residence times were about 3 hours in the first reactor and 2 hours in the second reactor. The production rate of polymer was 25 kg/hr. The polymer was discharged from the reactors as a granular product having an MFK of 2.0 dg/min.

An ethylene copolymer, Sample 7, was prepared using the metallocene rac dimethylsilanediyl-bis(2-methyl-4-phenylindenyl)zirconium dichloride. 9 g (14.3 m mol) were added to derivatized methylalumoxane (DMAO SAS L-1 from Albemarle Corporation, Baton Rouge, La.) in an amount of 780 ml of a 30 wt % MAO solution. The mix was stirred for 15 minutes. After stirring, the mixture was filtered and the insoluble material washed with 150 ml of tolulene. The combined filtrates were diluted with toluene (1850 ml). The solution was transferred to an 8l jacketed vessel equipped with an overhead stirrer. Silica (598.6 g, dehydrated at 600° C.) was slowly added over 30 minutes. Stirring was continued for an additional 5 minutes. The reaction mixture was gradually heated under vacuum over thirty minutes to 44° C., whereupon the mixture was visibly dry. Heating was continued for 3 hours at 68° C. under vacuum. The solids were cooled and collected to yield a light red, free-flowing solid (767 g, 0.11% Zr, 12.34% Al, Al/Zr= 379, 30.63% Si).

Several batches of the catalyst system were combined to provide the charge for the polymerization run. The catalyst system was oil slurred (15 wt %) for ease of addition to the reactor.

The procedure for polymerizing Sample 7 was as follows. The polymerization was conducted in a pilot scale continuous, stirred tank, bulk liquid phase polymerization process employing two reactors in series. The reactors were equipped with jackets for removing the heat of polymerization. The reactor temperature was set at 60° C. in the first reactor and 56° C. in the second reactor. Catalyst was fed at an estimated rate of 4.0 g/hr. Triethylaluminum (TEAL) was employed as scavenger and fed at a rate of 1.6 g/hr. The TEAL was fed as a 2 wt % solution in hexane solvent. Propylene was fed at a rate of 63.5 kg/hr to the first reactor and 27.2 kg/hr to the second reactor. The pressure was 28.9 kg/cm$^2$ in the first reactor and 25.9 kg/cm$^2$ in the second. Ethylene vapor concentration was 10.5 mol % in the first reactor and 11.4 mol % in the second reactor. Hydrogen was added for molecular weight control, at 990 mppm in the first reactor and 950 mppm in the second reactor. Residence times were 2.6 hours in the first reactor and 1.8 hours in the second reactor. The production rate of polymer was 18.1 kg/hr from reactor one and 9.5 kg/hr from reactor two. The polymer was discharged from the reactors as a granular product having an MFR of 4.0 and an ethylene content of 3.4 wt %.

A hexene-1 copolymer, Sample 8, was prepared using the same catalyst as was used to make Samples 2 and 3.

The procedure for polymerizing Sample 8 was similar to that reported previously for Sample 3, except that the hexene-1 flow rate was adjusted higher to yield an incorporation level of 3.0 wt %, rather than the 1.2 wt % level of Sample 3. 52 kg of product were collected having an MFR of about 5.5 dg/min and hexene-1 incorporation level of about 3.0 wt %.

TABLE 1

Description of Samples*

| Sample | Catalyst | MFR (dg/min) | Comonomer (wt %) | Melting Temperature (C.) | Hexane Extractables (wt %) |
|---|---|---|---|---|---|
| 1 | Z-N** | 3.8 | C2 (4.0) | 139 | 3 |
| 2 | Metallocene | 3.9 | C2 (1.1) | 139 | 0.4 |
| 3 | Metallocene | 4.2 | C6 (1.2) | 139 | 0.8 |
| 4 | Metallocene | 4.3 | none | 150 | 0.3 |
| 5 | Metallocene | 2.0 | none | 151 | 0.7 |
| 6 | Z-N** | 2.8 | C2 (0.5) | 158 | 1.3 |
| 7 | Metallocene | 4.0 | C2 (3.4) | 127 | 1.4 |
| 8 | Metallocene | 5.5 | C6 (3.0) | 127 | 1.2 |

*Percent extractables was determined via 21 CFR 177.1520 (d)(3)(i) and (ii).
MFR was determined via the method of ASTM D1238 Condition L. The melting temperature was determined from peak temperatures from DSC runs at 10C./min. heating and cooling rates. Comonomer content was determined via FTIR measurement (calibrated versus $^{13}$C NMR)
**Ziegler-Natta Catalyzed Control.

Shrink films were prepared from samples 1–8 using the following operations. Cast monolayer sheet (of typically 508 μm gauge or thickness) was fabricated on a Killion cast film line. The line has three 24:1 L/D extruders ('A' extruder at 2.54 cm diameter, 'B' extruder at 1.91 cm diameter and 'C' extruder at 1.91 cm diameter) which feed polymer into a feedblock. The same polymer was fed into all 3 extruders for monolayer sheet production. The line employed a 20.3 cm wide Cloeren die. Molten polymer exits the die and is cast onto a chill roll with a 20.3 cm diameter roll and 25.4 cm roll face. The casting unit is of adjustable speed to obtain film of the desired thickness. Operating conditions used are shown in Table 2.

TABLE 2

Extrusion Conditions During Casting of Monolayer Sheet

| Variable | 'A' Extruder | 'B' Extruder | 'C' Extruder |
|---|---|---|---|
| Zone 1 T(C) | 218 | 218 | 218 |
| Zone 2 T(C) | 221 | 221 | 221 |
| Zone 3 T(C) | 232 | 232 | 232 |
| Adapter 1 T(C) | 238 | 238 | 238 |
| Adapter 2 T(C) | 238 | 238 | — |
| Die/Feedblock (C) | 266 | — | 266 |
| Extr Speed (rpm) | 114 | 93 | 131 |
| Line Speed (mpm) | | 1.5 | |
| Chill Roll T(C) | | 36 | |
| Gauge (μm) | | 508 | |

Following the production of cast sheet, 5.08 cm×5.08 cm squares of the sheets were stretched (to 6×6 along MD×TD) using a T. M. Long stretching machine. For the stretching of the copolymer samples (Samples 1, 2, 3, 7 and 8 in Table 1), a stretching temperature of 138° C. was used for Samples 1, 2, and 3 and 124° C. for Samples 7 and 8. For the stretching of metallocene homopolymer, Samples 4 and 5 were compared versus Ziegler-Natta polymer Sample 6. To produce clear, crisp, stretched films from these homopolymers, a stretching temperature of 154° C. was used. A preheat time of about 25 sec, prior to stretching, was adopted in all cases.

Film product data are shown in Tables 3 and 4. Table 3 compares the films made from conventional Zeigler-Natta random copolymer (Sample 1 at approximately 4 wt % comonomer) with films made from four metallocene-derived random copolymers (Samples 2 and 3 at approximately 1 wt % comonomer and Samples 7 and 8 at approximately 3 wt % comonomer). Table 4 compares films made from metallocene homopolymer Samples 4 and 5 with Ziegler-Natta catalyzed polymer Sample 6.

TABLE 3

Properties of Stretched Random Copolymer Films*

| Property | Sample 1 (Control) | Sample 2 | Sample 3 | Sample 7 | Sample 8 | Test Method |
|---|---|---|---|---|---|---|
| Thickness (μm) | 17.8 | 15.2 | 15.2 | 27.9 | 25.4 | Profilometer |
| 1% Sec. Modulus (MPa) | 1240 | 2096 | 1834 | 1290 | 1435 | ASTM D 882 |
| Yield Tensile (MPa) | 37 | 56 | 57 | 43 | 44 | ASTM D 882 |
| Ultimate Tensile (MPa) | 152 | 200 | 193 | 155 | 162 | ASTM D 882 |
| Ultimate Elongation (%) | 61 | 58 | 52 | 50 | 71 | ASTM D 882 |
| Haze (%) | 0.4 | 0.5 | 0.5 | 0.7 | 1.0 | ASTM D 1003 |
| Gloss (%) | 92 | 93 | 91 | 85 | 94 | ASTM D 2457 |
| WVTR @ 37.8° C. 100% RH | 10.5 | 7.1 | 7.8 | 11.0 | 9.3 | ASTM F 372 |

TABLE 3-continued

Properties of Stretched Random Copolymer Films*

| Property | Sample 1 (Control) | Sample 2 | Sample 3 | Sample 7 | Sample 8 | Test Method |
|---|---|---|---|---|---|---|
| (g/m²/day per 25.4 μm) | | | | | | |
| Shrinkage (% @ 135° C., 3 min) | 41 | 41 | 46 | 65 | 66 | Company Test Procedure* |
| Seal Strength (g/2.54 cm) @ 130° C. | 64 | 50 | 68 | 440 | 163 | Company Test Procedure* |
| Seal Strength (g/2.54 cm) @ 135° C. | 123 | 104 | 127 | 1694 | 1140 | Company Test Procedure* |
| Seal Strength (g/2.54 cm) @ 140° C. | 123 | 204 | 136 | 4073 | 2815 | Company Test Procedure* |
| Shrink Tension (g force) @ 110° C. | 86 | 125 | 109 | 215 | 204 | Company Test Procedure* |

*Shrinkage was measured as the percentage decrease in length of a sample of film along the MD, after 3 minutes in a circulating air oven at 135° C. Seal strengths were measured on films sealed using a Theller film sealer (Model PC) at the temperatures shown. After conditioning at 23° C. for 24 hours, seal strengths were measured using a United six station machine. Sealing conditions were 206.8 kPa seal pressure, 0.5 second seal dwell time, 2.54 cm wide film strips, 3 test specimens per sample, 50.8 cm per minute test speed. Shrink tension force was determined by mounting a film strip, 2.54 cm wide and cut along the MD, in the jaws of an Instron machine (Model 1122). The separation of the jaws was 5.08 cm. An environmental chamber surrounded the jaws. The chamber space could be heated and controlled to desired temperatures to induce shrinkage and the associated shrink tension force in the film samples. Experiments were conducted at a temperature of 110° C. The film strips were mounted taut at ambient temperature following which the environmental chamber was closed and the temperature raised to 110° C. Once the test temperature was reached, the test was continued for 20 minutes at this temperature. The tension force developed in the film from the time of initial loading was recorded on a strip chart recorder. The final leveled-out force reading when the film had equilibrated at 110° C. was taken as the shrink tension force at that temperature (g force). Two runs per sample were conducted at 110° C. to check reproducibility and average the data.

For resins with the same melting temperature and similar MFR (i.e., Samples 1, 2, and 3 in Table 3), the metallocene—based shrink films provide comparable shrinkage but significantly higher (>25%) shrink tension forces at 110° C. than does the Ziegler-Natta based shrink film, which is unexpected. Between the two metallocene-based films, Samples 2 and 3, the shrink tension forces are similar. There does not appear to be any significant shrink tension benefits between ethylene and hexene-1 as comonomer.

Shrink tension relates to the force that the final shrink packaging applies on the package contents at a packaging temperature. Generally, a high shrink tension force (but below the force level where damage or deformation is inflicted on the package contents) is highly desirable to provide a taut, crisp packaging that secures the package contents as well as provides an appealing presentation.

With metallocene catalyzed propylene polymer, the shrink properties of the films can be tailored to meet the desired target by adjusting the comonomer content. This can be seen by comparing Samples 1, 7 and 8 in Table 3. The level of comonomer is roughly the same across these 3 samples (3–4 wt %). The shrinkage levels (at 135° C. for 3 min), however, for the metallocene polymers (Samples 7 and 8) are noticeably higher (>30%) than that of Sample 1, the Z-N control. The shrink tension values are also substantially higher for the metallocene polymers (more than twice as high as Z-N control Sample 1). The metallocene catalyzed propylene polymers thus provide a much greater capability for tailoring shrink properties through adjustment of comonomer content, compared to conventional Ziegler-Natta propylene polymers.

In addition to the surprising shrink behavior of the metallocene-based oriented shrink films, the data in Table 3 show that the metallocene-based oriented shrink films (Samples 2 and 3) have more than 50% higher stiffness, higher tensile strength and better moisture barrier than Ziegler-Natta based shrink films (Sample 1) of similar resin MFR and melting temperature. Also, FDA extractables are lower for the metallocene-based films (see Table 1), allowing use in a wider array of FDA packaging conditions and applications. Film haze and gloss values are comparable to the Ziegler-Natta based films. The balance of properties of the metallocene-based films is thus very favorable, with considerable leeway for optimization, depending on which film attributes are desired and valued. For example, increasing the comonomer level (up from the 1% of Samples 2 and 3) will provide film with easier sealing and stronger seals, higher shrinkage and shrink tension and comparable stiffness and WVTR as compared to conventional Ziegler-Natta based shrink films. This is confirmed from a comparison of the properties of metallocene based Samples 7 and 8 versus Ziegler-Natta control Sample 1 in Table 3. To a certain degree, film shrinkage and shrink tension can also be tailored by adjusting the fabricating conditions.

Table 4 shows the value of films made from metallocene catalyzed homopolypropylenes (Samples 4 and 5) compared to film made from Ziegler-Natta catalyzed polymer (Sample 6). The data show that despite the 8° C. lower melting temperature of the metallocene polymers (Tm 150° C. versus 158° C.), the metallocene polymer film (particularly Sample 5) compares very favorably with the Ziegler-Natta control (Sample 6). Selecting a metallocene homopolymer with an even lower melting temperature (about 145° C. versus the 151° C. of Sample 5) will permit shrink film having higher levels of shrinkage and shrink tension. This is further demonstration of the favorable balance of properties and leeway for optimization afforded by metallocene propylene polymers.

TABLE 4

Properties of Stretched Homopolypropylene Films*

| Property | Sample 4 | Sample 5 | Sample 6 (Control) | Test Method |
|---|---|---|---|---|
| Thickness (μm) | 18 | 18 | 18 | Profilometer |
| 1% Sec. Mod (MPa) | 2134 | 2250 | 2309 | ASTM D 882 |
| Ultimate Tensile (MPa) | 181 | 195 | 200 | ASTM D 882 |
| Ultimate Elongation | 61 | 70 | 76 | ASTM D 882 |

TABLE 4-continued

Properties of Stretched Homopolypropylene Films*

| Property | Sample 4 | Sample 5 | Sample 6 (Control) | Test Method |
|---|---|---|---|---|
| Haze (%) | 1 | 0.9 | 0.3 | ASTM D 1003 |
| Gloss (%) | 92 | 94 | 95 | ASTM D 2457 |
| WVTR @ 37.8° C., 100% RH (g/m²/day per 25.4 μm) | 5.7 | 5.9 | 6.2 | ASTM F 372 |
| Shrinkage (% @ 135° C., 3 min) | 8 | 12 | 12 | Company Test Procedure* |
| Shrink Tension (g force) @ 110° C. | 23 | 55 | 52 | Company Test Procedure* |

*Shrinkage was measured as the percentage decrease in length of a sample of film along the MD, after 3 minutes in a circulating air oven at 135° C. Shrink tension force was determined by mounting a film strip, 2.54 cm wide and cut along the MD, in the jaws of an Instron machine (Model 1122). The separation of the jaws was 5.08 cm. An environmental chamber surrounded the jaws. The chamber space could be heated and controlled to desired temperatures to induce shrinkage and the associated shrink tension force in the film samples. Experiments were conducted at a temperature of 110° C. The film strips were mounted taut at ambient temperature following which the environmental chamber was closed and the temperature raised to 110° C. Once the test temperature was reached, the test was continued for 20 minutes at this temperature. The tension force developed in the film from the time of initial loading was recorded on a strip chart recorder. The final leveled-out force reading when the film had equilibrated at 110° C. was taken as the shrink tension force at that temperature (g force). Two runs per sample were conducted at 110° C. to check reproducibility and average the data.

The foregoing description is intended to exemplify preferred embodiments of the invention. The invention includes other embodiments not necessarily within the scope of any expressed examples or embodiments recited above. The invention, therefore, is limited only as set forth in the appended claims.

We claim:

1. A film comprising one or more layers of shrink film comprising metallocene catalyzed, propylene polymer having hexane extractables of less than 3 weight percent, wherein the polymer is either a propylene homopolymer or propylene copolymer.

2. The film of claim 1 wherein the polymer is isotactic and wherein the shrink film is oriented at least once.

3. The film of claim 1 wherein the propylene polymer is isotactic.

4. The film of claim 2 wherein the hexane extractables is less than 2 weight percent.

5. The film of claim 2 wherein the polymer is substantially isotactic.

6. A film comprising one or more layers of shrink film comprising metallocene catalyzed, isotactic propylene polymer having hexane extractables of less than 3 weight percent, and wherein the polymer comprises from about 0.1 to about 20 weight percent comonomer.

7. The film of claim 6 wherein the shrink film is oriented at least once.

8. The film of claim 6 wherein the propylene polymer is substantially isotactic.

9. The film of claim 6 wherein the hexane extractables is less than 2 weight percent.

10. The film of claim 6 wherein the polymer comprises from about 0.5 to about 15 weight percent comonomer.

11. The film of claim 6 wherein the polymer comprises from about 0.5 to about 6 weight percent comonomer.

12. The film of claim 6 wherein the comonomer has 2, 4, 5, 6, or 8 carbon atoms.

13. The film of claim 6 wherein the comonomer has 2, 6, or 8 carbon atoms.

14. Packaging material prepared from the film of claim 1.

15. Packaging material prepared from the film of claim 6.

* * * * *